Patented Nov. 4, 1941

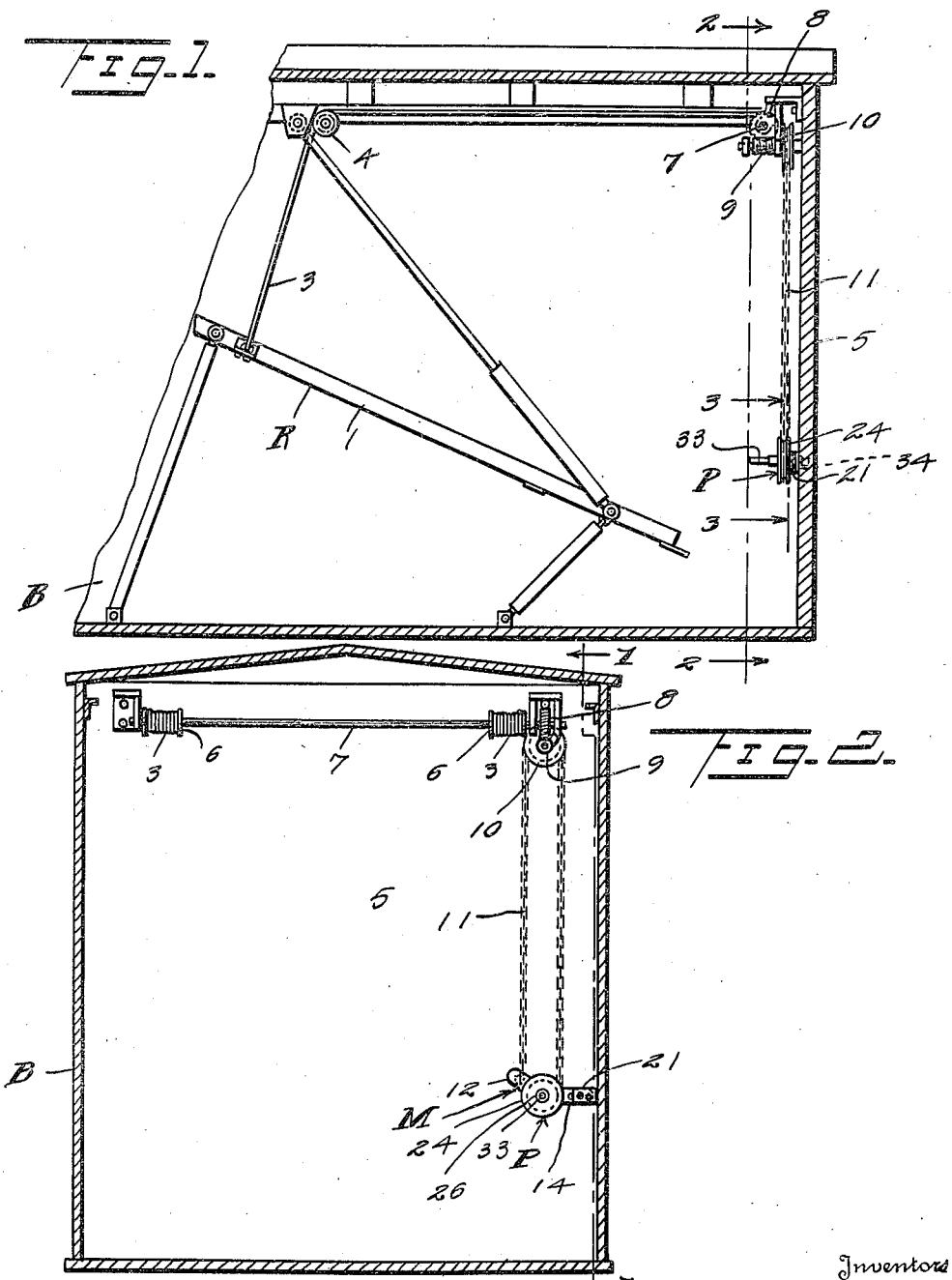

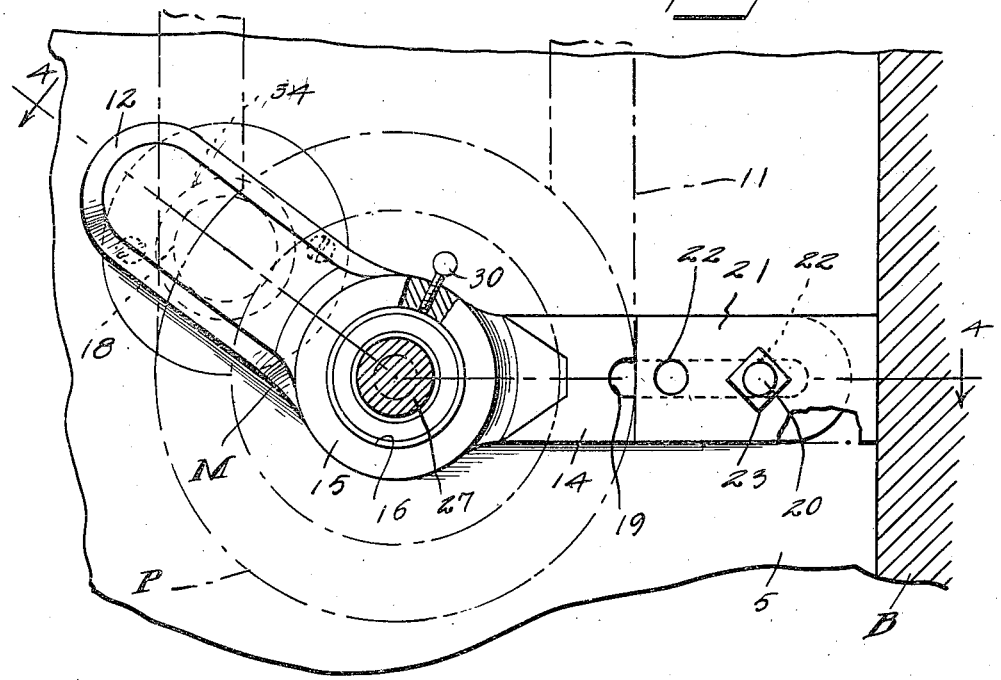
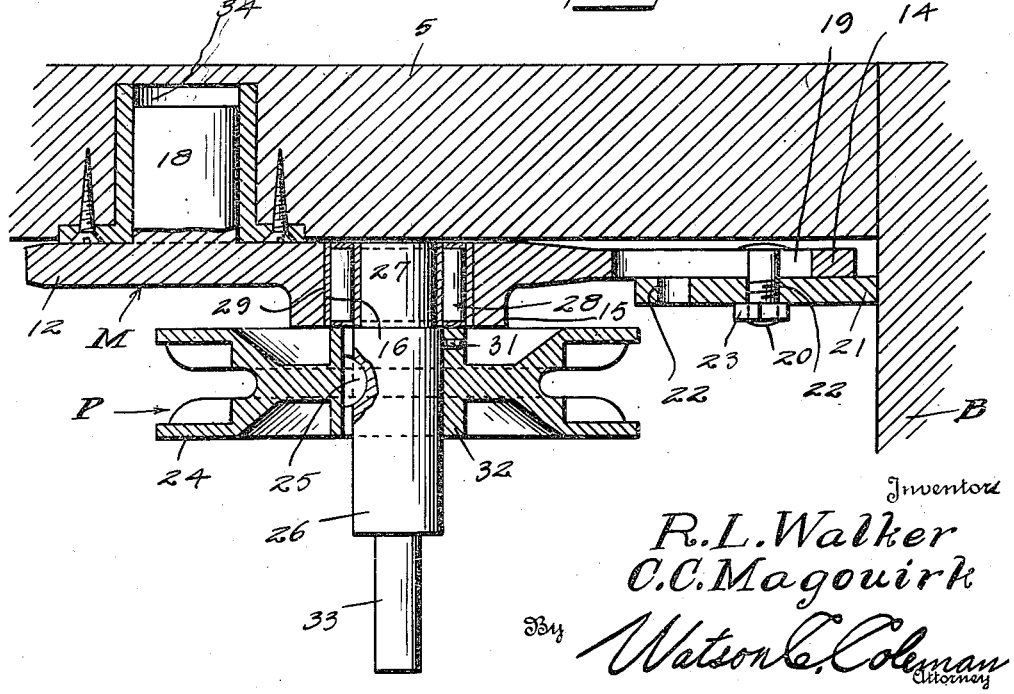

2,261,455

UNITED STATES PATENT OFFICE 2,261,455

AUTOMOBILE RACK LIFTER

Richard L. Walker and Carl C. Magouirk, Cimarron, Kans.

Application September 9, 1939, Serial No. 294,211

1 Claim. (Cl. 74—242.15)

This invention relates to an automobile rack lifter, and it is primarily an object of the invention to provide a device of this kind affording a medium whereby a rack may be raised quickly and easily.

In the shipment of automobiles in box cars it is now a general practice to equip such cars in the end portions thereof with racks and which racks, after automobiles have been loaded thereon, are raised so as to make room for loading two additional automobiles in the car. In unloading the automobiles, it is necessary to remove the two lower automobiles, then lower one of the racks and remove the automobile therefrom and then raise the rack before removing the automobile from the box car. In the general types of racks now used, the raising of the same is accomplished thru the medium of an endless chain. At the production plants in nearly every instance, power means are provided for raising the racks and the automobiles thereon but there is no provision made to facilitate the raising of the empty rack at the point of destination except by manual operation of the chain which requires hard labor and often two men to raise the rack within ten to twenty minutes. It is another object of the invention to provide a device which can be readily used at a destination for raising the rack within a few minutes time and requiring the services of only a single operator.

A further object of the invention is to provide a device especially designed and adapted for use for the raising of an auto rack at the time of unloading in a manner which eliminates hand pull thus materially lessening the danger of soiling the finish and interior of an automobile while unloading.

An additional object of the invention is to provide a device of this kind which, when in use, can be readily operated to take up any undue slack in the operating chain and wherein means are provided for maintaining the device in effective working position.

The invention consists in the details of construction and in the combination and arrangement of the several parts of our improved automobile rack lifter whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a fragmentary view partly in section and partly in elevation illustrating a rack lifter constructed in accordance with an embodiment of our invention in applied or working position;

Figure 2 is a sectional view taken substantially on the line 2—2 of Figure 1;

Figure 3 is an enlarged fragmentary sectional view taken substantially on the line 3—3 of Figure 1;

Figure 4 is a sectional view taken substantially on the line 4—4 of Figure 3.

As illustrated in the accompanying drawings, R denotes a rack or frame pivotally supported within an end portion of a box car B and which is adapted to hold an automobile loaded thereon in a raised position. An equipment of this kind is used by nearly all railroads in the shipping of automobiles and such equipment forms no part of the present invention. It is to be stated, however, that when the rack or frame is unloaded or before what is known as "decking" the rack or frame R is raised into a position closely adjacent to the top of the car B.

As illustrated in the accompanying drawings, the side members 1 of the rack or frame R each has secured thereto, as at 2, at a desired point intermediate its ends a flexible member 3 such as a steel cable. This cable 3 extends up and over a suitably positioned guide roller 4 journaled in brackets secured to the top or roof of the car B. The cable 3 then extends toward an end wall 5 of the car B along the roof for winding around a drum 6 fixed for rotation with a shaft 7. This shaft 7 is supported by the end wall 5 of the car B at the top portion thereof. This shaft 7 has fixed thereto a worm wheel 8 in mesh with a worm 9 operatively supported by the end wall 5 of the car B or otherwise as may be preferred.

Rotating with the worm 9 is a sprocket wheel 10 over which is trained an endless chain 11. This chain 11 extends downwardly along the adjacent end wall 5 of the car B to a point convenient for manipulation of the chain to turn the sprocket wheel 10 when it is desired to raise or lower the rack or frame R.

As is well known, a rack or frame R and its associated parts is positioned in each end portion of a box car and in loading each of the racks or frames R the same is lowered to a position upon the floor of the car body and after the automobile has been properly placed upon the rack or frame said rack or frame is swung upwardly and maintained in such position in the usual manner. After the raising of the loaded racks or frames additional automobiles are loaded in the car B thereunder. In unloading a car the bottom automobiles are first removed from the car and then one of the loaded racks or frames R is lowered and the automobile removed therefrom. However, before such automobile can be taken out of the box car B it is necessary that such unloaded rack or frame be raised to a position closely adjacent to the top or roof of the box car B. While at the production plants provision is generally made for operating the pull chain by a power means, yet there is no such power means provided at the points of destination for raising a rack or frame R to its uppermost position. In fact, at the present time such raising of a rack or frame R is done by manually pulling upon the chain 11 and such operation generally necessitates two persons and requires a period of time between ten and twenty minutes to raise the rack or frame R. This manual operation often results in the workmen getting their hands and clothing unduly soiled as a result of handling the greasy chain 11 with the resultant liability of soiling the finish and interior of the automobiles while unloading.

Our improved device is particularly designed for use by the dealer at a point of destination and which device coacts with the chain 11 in a manner to quickly effect the desired raising of a rack or frame R and with the substantial elimination of the hands and clothing of the workmen being soiled. Our improved operating device also readily allows the raising of a rack or frame R by a single operator.

In the embodiment of our invention as illustrated in the accompanying drawings, M denotes an elongated member having its opposite end portions formed to provide two elongated arms 12 and 14, one substantially coplanar with the other. These arms 12 and 14 are on a relative angle of approximately thirty-five degrees although such angular relation may be varied as preferred.

The inner or meeting end portions of the arms 12 and 14 are formed to provide a bearing 15 having its bore 16 of a material radius. The bearing 15 extends beyond one side of the member M and the bore 16 is disposed thru the member.

The arm 12 of the member M at substantially its longitudinal center has extending outwardly and laterally therefrom at the sides thereof remote from the bearing 15 a stub shaft 18. This stub shaft 18 is preferably integral with the arm 12.

The arm 14 of the member M at its transverse center and for a material distance therealong is provided with a slot 19 through which is disposed the holding bolts 20 carried by an end portion of an elongated and relatively wide lock plate 21. This plate 21 in one end portion and at its transverse center is provided with the longitudinally spaced openings 22 through which a bolt 20 selectively passes. This plate 21 overlies a side face of the arm 14 of the member M and the bolt 20 is of a length to extend beyond the opposite face of the arm 14 so that a nut 23 may be threaded upon said extended portion of the bolt 20 for clamping contact with the arm 14 to maintain the plate 21 in its desired selected adjustment lengthwise of the arm 14.

Associated with the member M is a pulley structure P comprising a chain pulley 24 of desired size and which is adapted to be engaged within the lower bight of the chain 11 so that upon rotation of the pulley 24 the associated rack or frame R may be readily and quickly raised. This pulley 24 is keyed, as at 25, to a shaft 26. This shaft 26 is of a length to extend a distance beyond each side of the applied pulley 24 and the extended portion 27 at one side of the pulley 24 is reduced in diameter. Mounted upon this reduced portion 27 is an anti-friction gear assembly 28 herein disclosed as of a roller type although any other form of assembly can be employed which will properly comply with the requirements of practice.

This gear assembly 28 includes an outer sleeve 29 of a diameter to be snugly received within the bore 16 of the bearing 15 and after being so applied the sleeve 29 is effectively held against rotation within the bore 16 by the thumb screw 30 or the like threading thru the wall of the bearing 15 for binding contact with the sleeve 29. It is, therefore, believed to be obvious that when the pulley structure P is operatively engaged with the member M the shaft 26 together with the pulley 24 rotate with a minimum of frictional resistance.

The pulley 24 after being applied to the shaft 26 and upon which it snugly fits, is locked against movement lengthwise of the shaft 26 by an Allen set screw or stud 31 threading through the wall of the hub 32 of the pulley 24 and having binding contact with the shaft 26.

The extended end portion of the shaft 26 remote from the reduced end portion 27 is formed to provide an elongated shank 33. This shank 33 is adapted to be locked within the socket or chuck of a conventional electric drill, such as is to be found amongst the equipment of all dealers in automobiles, whereby such drill may be employed as a power means at the point of destination for raising a rack or frame R.

In practice the stub shaft 18 is engaged within a metallic pilot or bushing 34 suitably mounted upon the end wall 5 of the car B and adjacent to the lower portion of the chain 11.

The size of the pulley 24 mainly depends upon the type of drill to be used. If the drill is of a one-half inch type the pulley used should preferably be five inches in diameter and if a three quarter inch drill the diameter of the pulley should preferably be seven inches, etc. When the size of the pulley 24 is such as to necessitate taking up slack in the chain 11 or the chain 11 becomes slack from undue wear of the pilot or bushing 34 or from any other cause, such slack can be readily taken up by swinging the arm 14 downwardly with the stub shaft 18 within the bushing or pilot 34 as a pivot. After the arm 14 has been sufficiently moved to tighten the chain 11 the lock plate 21 is moved outwardly along the arm 14 a distance sufficient to allow said plate 21 to have contact with the adjacent side wall 35 of the car body B or kindred surface. This contact of the plate 21 with said side wall 35 or kindred surface effectively holds the member M in position with respect to the chain 11. It is believed to be obvious that before applying the device into working position with respect to the chain 11, the plate 21 is retracted and that after the plate 21 has been extended into desired working position the same is maintained in such position by tightening the bolts 23.

It is also to be pointed out that the bushing or pilot 34 is spaced from the coacting side wall 35 or kindred surface a distance slightly greater than the distance from the axial center of the stub shaft 18 and the outer end of the arm 14. It is also believed to be apparent that the eccentric relation of the stub shaft 18 with respect to the bearing 15 assures the desired tightening of the chain 11 as the arm 14 is swung downwardly.

From the foregoing description it is thought to be obvious that an automobile rack lifter constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

A portable device for operating a flexible endless driving element for a vertically movable automobile rack within a box car or the like comprising an elongated member provided at one end portion with a laterally disposed stub shaft to provide means for pivotally mounting the member, a second shaft having one end portion rotatably engaged with the elongated member at a point spaced inwardly of the stub shaft, said second shaft laterally extending from the elongated member in a direction opposite to that of the stub shaft, the outer end portion of the second shaft having means for rotating the same, a pulley fixed to the second shaft for engagement with the flexible driving element, the end portion of the elongated member remote from the stub shaft being provided therealong with a slot, a plate overlying said slotted end portion of the elongated member and independently movable lengthwise of the member, and means carried by the plate and extending through the slot of the member for locking said plate in selected position upon the member.

RICHARD L. WALKER
CARL C. MAGOUIRK.